INVENTORS
Alfred J. Jacobs
Joseph T. Napier
BY
Boykin, Mohler, Foster & Schlemmer
Attorneys INVENTORS
Alfred J. Jacobs
Joseph T. Napier
BY Boyken, Mohler, Foster & Schlemmer
Attorneys

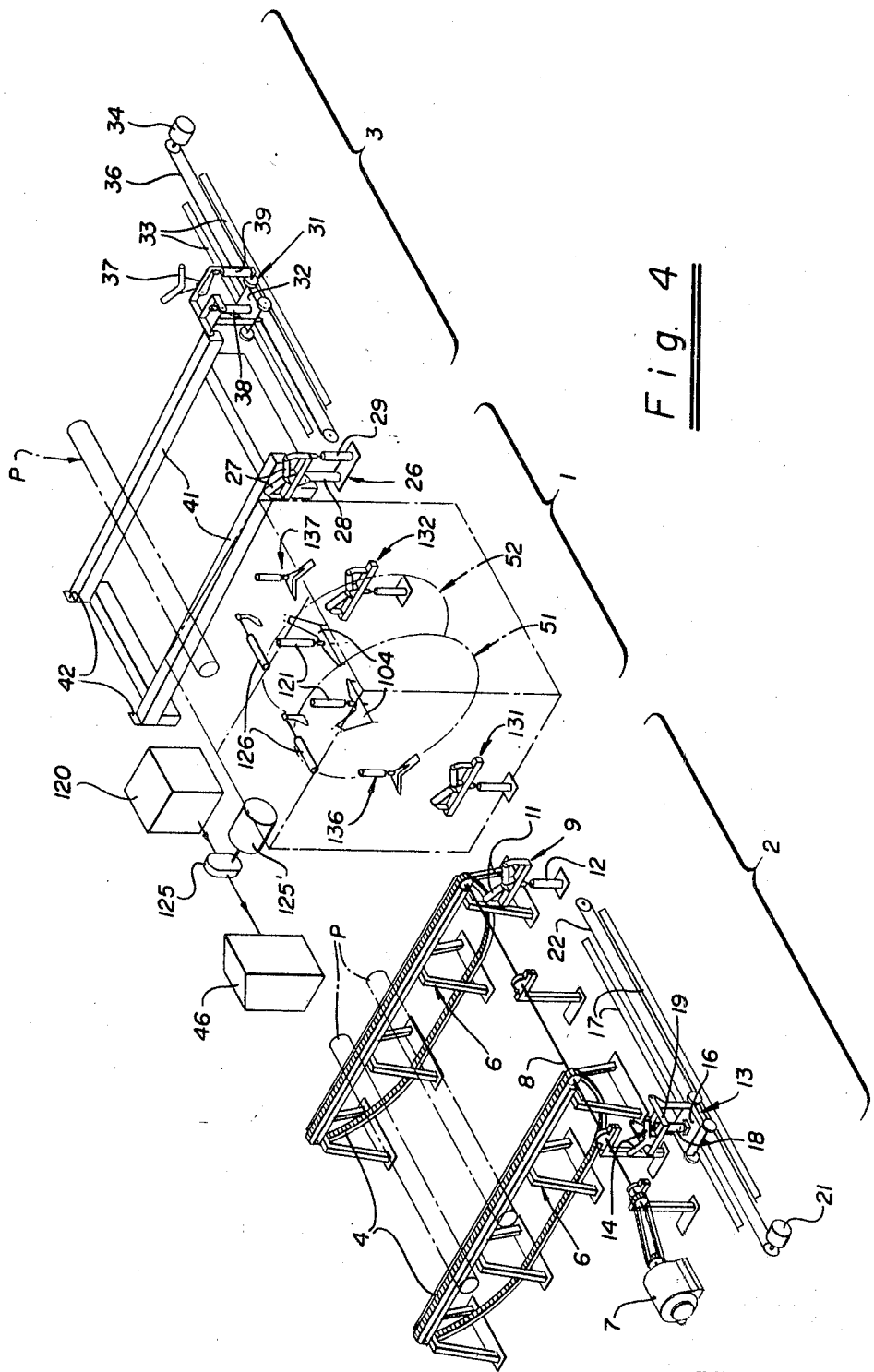

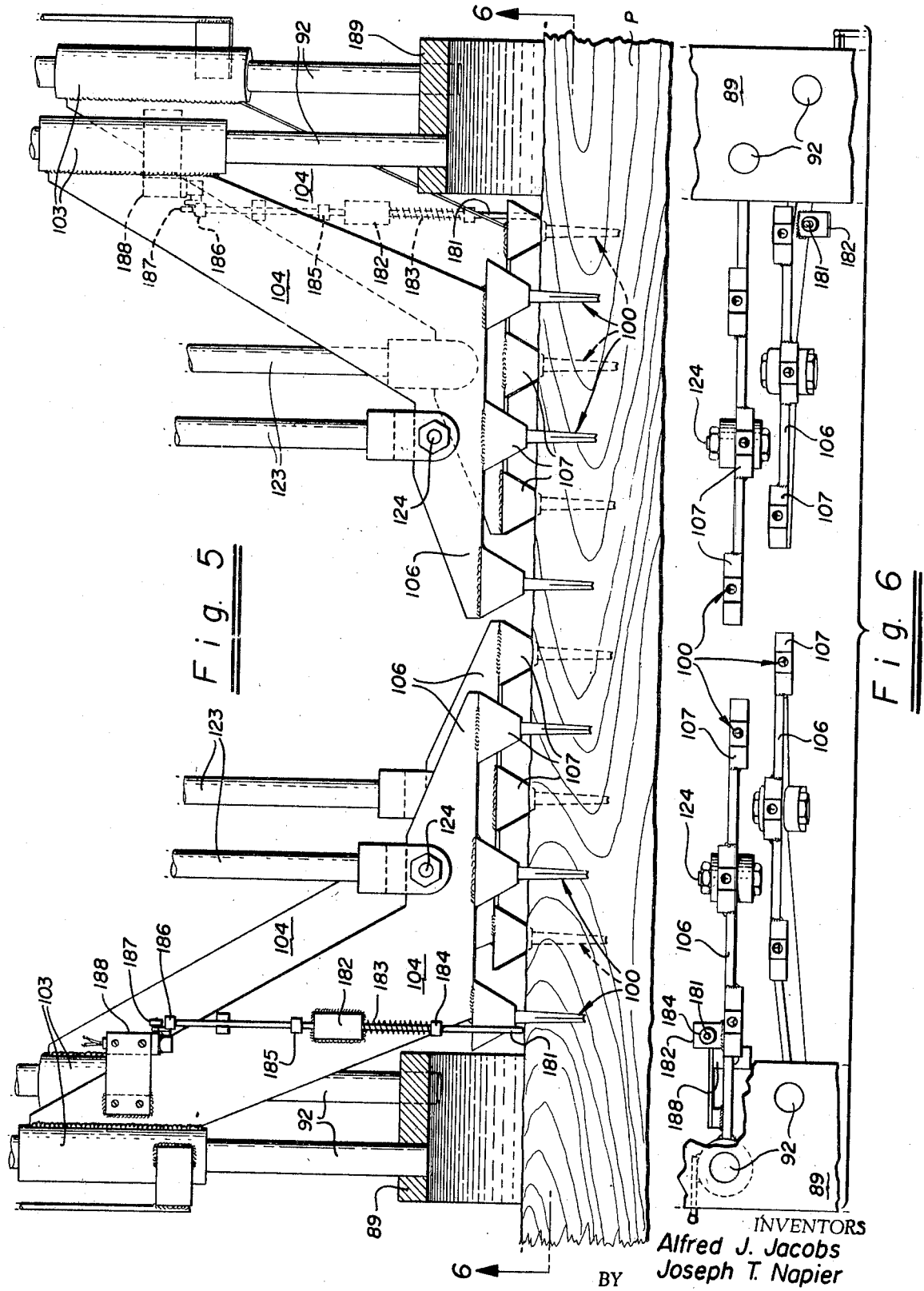

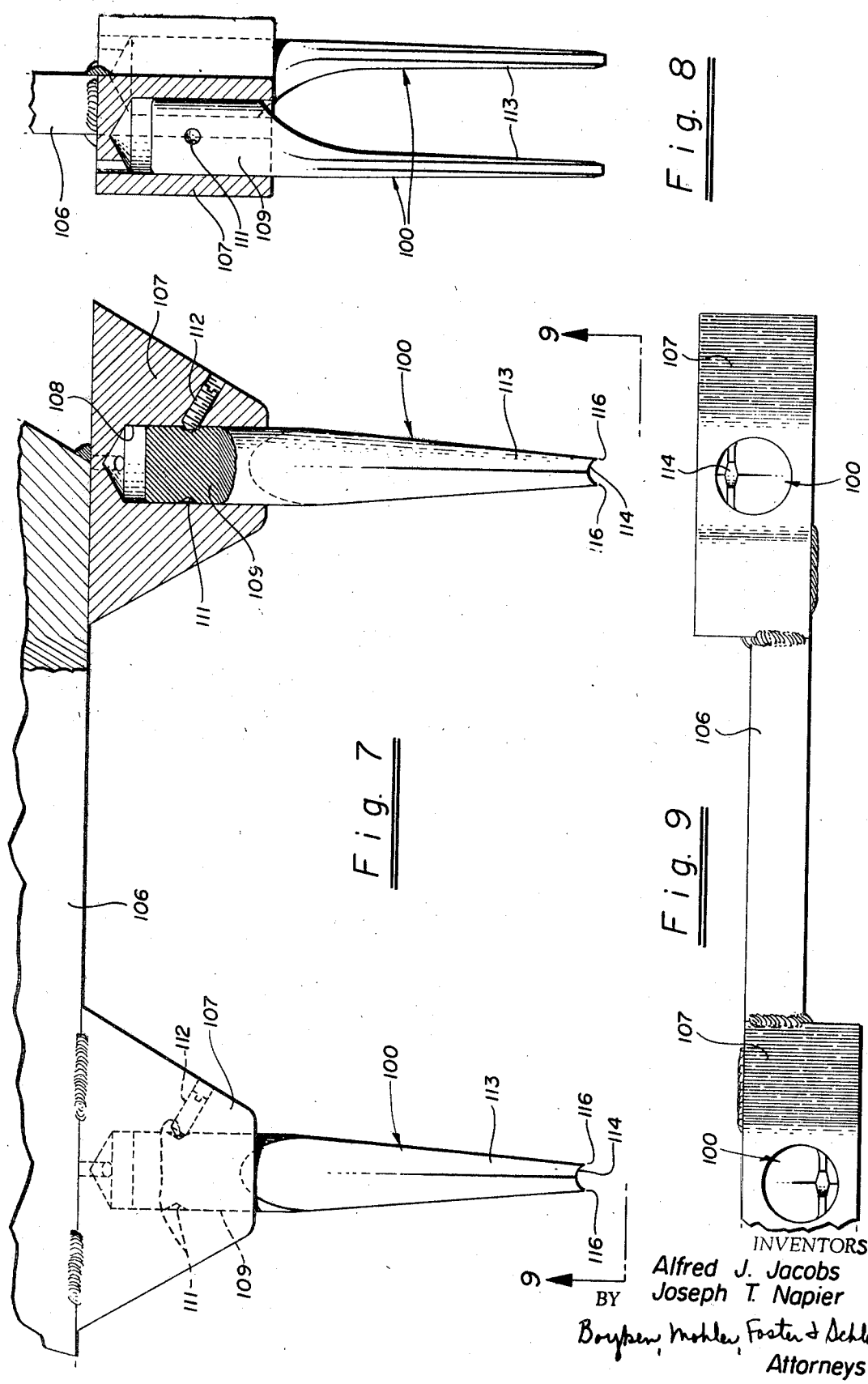

June 2, 1970     A. J. JACOBS ET AL     3,515,184

APPARATUS FOR DEEP INCISING POLES

Filed April 27, 1966     8 Sheets-Sheet 7

INVENTORS
Alfred J. Jacobs
BY   Joseph T. Napier

Boyken, Mohler, Foster & Schlemmer
Attorneys

June 2, 1970     A. J. JACOBS ET AL     3,515,184
APPARATUS FOR DEEP INCISING POLES
Filed April 27, 1966     8 Sheets-Sheet 8
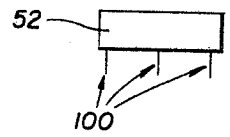
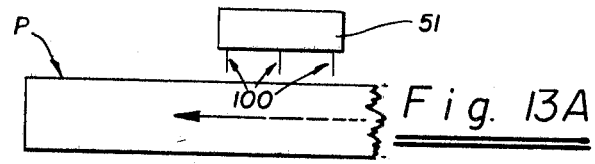
Fig. 13A
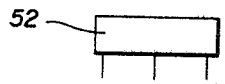
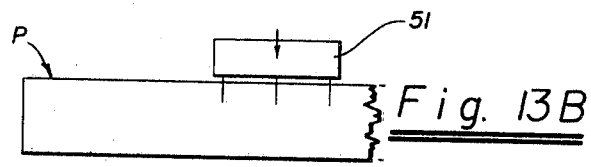
Fig. 13B
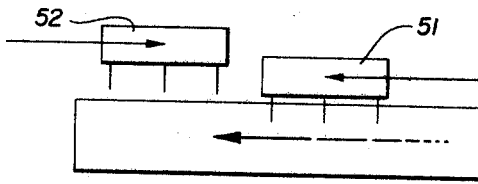
Fig. 13C
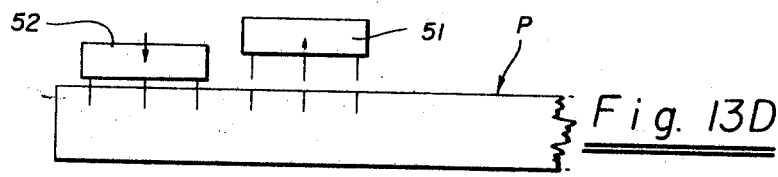
Fig. 13D
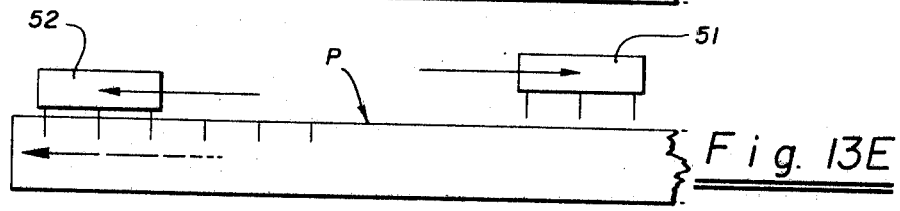
Fig. 13E
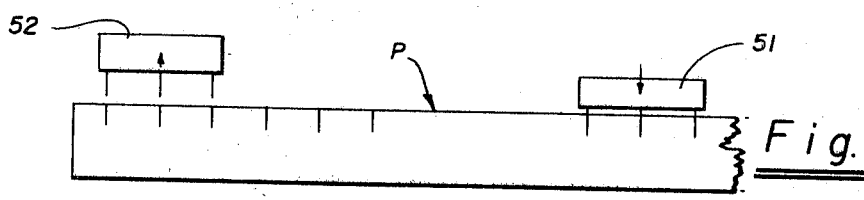
Fig. 13F
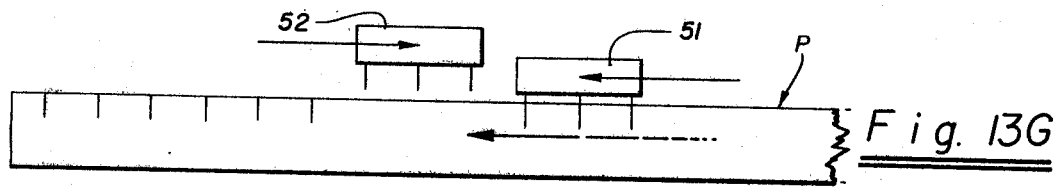
Fig. 13G
INVENTORS
Alfred J. Jacobs
Joseph T. Napier
Boyken, Mohler, Foster & Schlemmer
Attorneys 3,515,184
APPARATUS FOR DEEP INCISING POLES
Alfred J. Jacobs, San Leandro, and Joseph T. Napier, Alameda, Calif., assignors to J. H. Baxter & Co., San Francisco, Calif.
Filed Apr. 27, 1966, Ser. No. 545,686
Int. Cl. B27k 3/00
U.S. Cl. 144—2     8 Claims

ABSTRACT OF THE DISCLOSURE

An apparatus for deep incising wooden poles to prepare such poles for impregnation with a suitable preservative. The incising head has incising elements for incising a predetermined longitudinal section of a pole to a predetermined depth about its full periphery in a single step without rotation of the pole about its longitudinal axis.

---

This invention relates generally to the incising of wooden articles. More particularly, this invention relates to an apparatus for producing deep incised wooden articles, such as poles, to prepare such articles for impregnation with a suitable preservative intended to extend the useful life of such articles. Still more particularly, this invention relates to an apparatus for deep incising wooden articles to a depth not obtainable with heretofore known mechanical procedures so that holes are formed which extend deeply thereinto, preferably through the sap wood layers and into the heart wood core thereof. In this regard, the incised holes are of a particular type and preferably are formed in a predetermined pattern which is designed to minimize or obviate the possibility of checking of the articles so that the strength of the pole is not adversely affected to any appreciable extent due to such incising.

While hereinafter reference is specifically directed to the incising of wooden poles by way of example, it should be understood that this invention has applicability to and is contemplated for use in conjunction with the incising of other articles also, such as pilings and posts intended to support docks and wharves, and the like. Thus, reference herein to incised "poles" is intended to include such other wooden articles which are normally treated with preservative to extend their useful life. Such incised and preservative-treated articles are commonly employed in the construction and utility industries for numerous uses.

The particular preservative employed forms no part of this invention but creosote and pentachlorophenol, or other oil-type or water-borne preservatives, in fluid form are commonly used. Any conventional impregnating apparatus and procedure may be employed to introduce a selected preservative into articles incised by this invention, and penetration of the preservative to a depth which insures thorough treatment is insured because of the deep incising accomplished with the subject procedure. In conjunction with such impregnation, seasoning (i.e. drying) of the poles, which normally precedes impregnation, is facilitated because moisture may more easily escape during a seasoning operation through the deep incised holes formed by the subject procedure than has been true heretofore.

As will be described, the subject apparatus employs incising elements which insure spreading of the fibers of the poles during the incising operation so that, when such incising elements are withdrawn from an incised pole, the holes formed thereby remain generally open and unrestricted. Such holes are formed without appreciably altering the strength of the poles. Such holes facilitate moisture removal during seasoning and also facilitate penetration of preservative into the pole in the generally radial direction, as well as penetration in the generally lateral direction into and between the respective sap wood and heart wood layers of the pole. Thus effective drying and deep preservative impregnation in both radial and peripheral directions from the outer periphery of the pole to the full depth of the holes formed by the incising elements may be accomplished. Normally, to insure thorough preservative penetration and impregnation, the preservative should be introduced into the incised poles under pressure.

While various machines and procedures have been employed heretofore for incising poles, the depth to which incising could be accomplished thereby has been quite restricted and normally has been limited to less than the thickness of the sap wood layers of the poles. In this connection, known procedures and machines cannot produce incised holes deeper than about one inch, with a maximum incising depth of about three-quarters inch being generally common. With the advent of more stringent treatment specifications by the users of poles, it has been found that such relatively shallow incising depths are inadequate to insure the effective seasoning and full penetration of preservative which is required to adequately guard against failure of treated poles during use.

In this regard, current desired requirements imposed by users of preservative treated poles stress deep preservative penetration which extends through the sap wood layers of the pole and into the heart wood core thereof. By way of example, Douglas fir trees of a size suitable for utility poles normally have sap wood layers exceeding one and one-half inches in thickness. Thus, known procedures and machines are unable to insure incising to the depth sought by users which makes possible the deep preservative impregnation desired without attendant appreciable loss in pole strength.

Therefore, to produce proper incising which will facilitate seasoning and insure adequate preservative penetration, irrespective of the exact nature of the particular trees being utilized, deep incising as carried out by this invention has been devised which results in full penetration of the sap wood layers extending into the heart wood core of the tree. With this invention incising to a depth of two and one-half to three inches has been found adequate to meet strict present day requirements, but greater incising depths are obtainable if required. Thus, the procedure of this invention has wide applicability which permits the same to be utilized in the incising of various types and sizes of trees to be used for poles. In this regard, as will be described, means preferably is provided in conjunction with the apparatus of this invention to limit the depth of incising as may be required to satisfy a particular need.

By incising into the heart wood core through all the sap wood layers of a given pole, thorough preservative penetration and attendant long life of the pole are insured because a deep preservative treated shell is formed around the pole which insures the natural strength of the pole over extended periods of use. If the untreated center of the heart wood core decays to some extent over an extended period, such decay is not critical because the greatest proportion of the strength of a pole resides in its outer heart wood layers and sap wood layers. In this regard, while it is generally desirable to impregnate the inner heart wood core with preservative to the maximum extent, a point of diminishing returns may be reached at which further preservative treatment of the heart wood core becomes uneconomical and unnecessary. Therefore, so long as the strength imparting sap wood layers and outer heart wood layers are thoroughly treated with preservative, adequate preservation of the pole normally is insured. Thus, poles deep incised by the present invention and subsequently seasoned and treated with a suitable preservative are capable of meeting the most stringent requirements imposed by current users of poles.

In this regard, as noted the deep incising effected with this invention also facilitates effective seasoning of the incised pole by known seasoning procedures, which may be effected by air drying under atmospheric conditions, or in a heated retort under vacuum conditions if more rapid drying is desired. The incised passages formed in the sap wood and heartwood layers by the deep holes of the incised pole provide openings through which entrained moisture may more easily be drawn off or escape. Thus effective, more thorough and more rapid drying before impregnation is obtainable which, in turn, minimizes the extent of pole shrinkage during use, caused by drying at that time. By thus insuring drying to the maximum extent in seasoning operations performed prior to impregnation, checking commonly caused by internal shrinkage attributable to drying during use is also minimized, thereby further enhancing long pole life.

Care must be taken when poles are being incised to avoid the formation of checks which would adversely affect the strength of the pole when placed in use. Incising with this invention has been specifically designed to obviate or greatly reduce the possibility of such checking.

As will be described hereinafter, the apparatus of this invention employs incising elements of a particular type and contour which together impart a particular incising pattern about the full periphery of the pole. The incising pattern preferably employed herewith has been selected to enhance thorough and effective seasoning and preservative penetration of the incised pole while at the same time minimizing to the greatest extent possible any weakening effect of the incised holes on the incised pole.

From the foregoing it should be understood that objects of this invention among others, include: the provision of an apparatus for deep incising wooden articles; the provision of an apparatus for selectively incising articles for any predetermined portions or all of their full lengths; the provision of an incising apparatus for insuring the formation of incised holes through the outer sap wood layers and into the inner heart wood core of a wooden article; the provision of an incising apparatus which will incise a predetermined section of an article about its full periphery in a single step and without rotation of the article about its longitudinal axis; the provision of an incising apparatus which imparts a pretedermined incised pattern to an article desired to insure most effective seasoning of and penetration of a preservative into the article following incising thereof; the provision of an incising apparatus which employs incising elements of particular contour and configuration arranged to form holes in an article to facilitate seasoning thereof and to insure thorough subsequent impregnation thereof by a preservative without appreciably altering the strength thereof; the provision of an incising head at an incising station of an incising appartaus which includes a plurality of incising elements mounted thereon for movement generally in unison into a predetermined section of an article being incised in the apparatus; and the provision in an incising apparatus of means for automatically limiting the depth incising elements are forced into an article during an incising operation. These and other objects of this invention will become apparent from a study of the following description in which reference is directed to the appended drawings.

FIG. 4 is a generally schematic view of the apparatus showing means for introducing poles to be incised in sequence into the main incising portion of the apparatus and means for removing incised poles therefrom.

FIG. 5 is a side elevational view of portions of the incising heads employed in the subject apparatus.

FIG. 6 is a plan view of the portions of the incising heads of FIG. 5 taken in the plane of line 6—6 of FIG. 5.

FIG. 7 is a partially cut away side elevational view of two incising elements, and mounting means therefor, shown substantially to scale.

FIG. 8 is a partially cut away end elevational view of the incising elements of FIG. 7, showing the lateral offset therebetween.

FIG. 9 is a bottom plan view of the incising elements of FIG. 7 taken in the plane of line 9—9 of FIG. 7.

FIGS. 13A through 13G are generally schematic views showing a sequence of incising steps performed by the embodiment of the incising apparatus disclosed herein.

Figure 1:
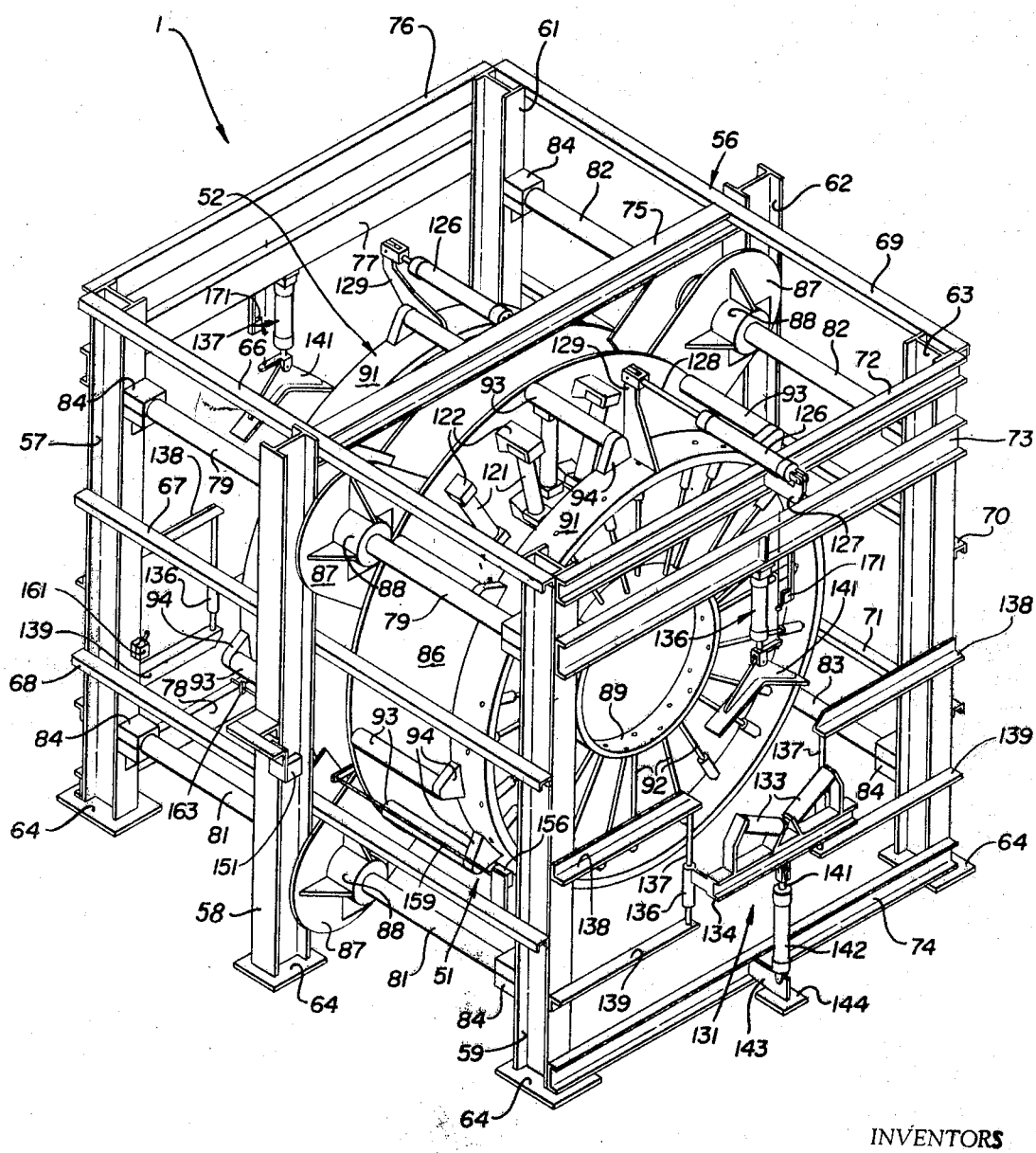
FIG. 1 is a generally isometric view of the main incising portion of the apparatus of this invention.

Referring first to the generally schematic showing of FIG. 4, a brief introductory description will be made of an overall apparatus which may be suitably employed in a commercial incising installation. The main incising portion of the apparatus, in which the actual incising operations are performed, is generally designated 1, parts of its various operative components being shown for purposes of illustration. Preferably provided in conjunction with and forming part of the overall incising installation is means, generally designated 2, for feeding poles to be incised in sequence into the main incising apparatus. Other means, generally designated 3, is provided for taking off and carrying away in sequence each incised pole after completion of an incising operation thereon. The infeed means 2 and the take off means 3 may take various forms but each preferably is capable of handling large heavy poles in sequence in a comparatively rapid incising procedure with little, if any, interruption between succeeding poles being incised.

Infeed means 2 illustrated comprises a pair of endless infeed conveyor chains 4 which pass over pulleys supported on a pair of parallel conveyor frameworks 6 adjacent the entrance end of incising apparatus 1. A suitable power source, such as an electric motor 7, is operatively connected with the conveyor chains through a chain drive shaft 8 which rotates the pulleys over which the chains 4 pass.

Mounted adjacent the discharge end of the conveyor chains generally in line with the longitudinal axis of the main incising apparatus is mechanism for receiving individual poles and introducing the same into the incising apparatus. Such mechanism comprises cradle structure 9 having angularly arranged supporting rollers 11 rotatably mounted thereon. The roller portion of cradle 9 is supported by a fixed vertical post 12 positioned therebeneath. A second cradle structure generally designated 13, which has a V-shaped support 14 mounted thereon, is supported on a movable dolly 16 which travels on a pair of spaced tracks 17 which extend in a direction generally normal to the conveyor chains 4 and which lead directly into the main body of the incising apparatus 1. The support portion 14 of the movable cradle structure 13 is adjustably and selectively movable in a vertical direction by means of a hydraulic cylinder 18, and its associated piston and rod, positioned therebeneath on the dolly. Cylinder 18 actuates a pivotal mounting bracket 19 on which support 14 is mounted.

Movement of dolly 16 toward or away from the incising apparatus 1 is effected by a reversible hydraulic drive motor 21 which drives a cable 22 over a pair of spaced pulleys, the opposite ends of such cable being connected with the frame of the dolly. Upon actuation of the motor in a given direction, the dolly may be moved toward or away from the main incising apparatus 1 to insert an end of a pole to be incised thereinto and to thereafter return to its normal position to receive a subsequent pole from the conveyor chains 4 when the pole supporting means of the incising apparatus is in control of such pole. In this regard, it should be understood that upon selective actuation of the conveyor chains 4, a pole P positioned thereon from any suitable source of supply will be carried thereby and deposited onto the cradles 9 and 13, following which each such pole will be introduced by moving the dolly 16 toward the incising apparatus 1. Vertical positioning of the cradle support 14, in conjunction with vertical positioning of supporting means of the main incising apparatus 1, to align a pole carried thereon with the axis of the incising apparatus 1, may be effected by introducing fluid from any suitable hydraulic fluid source into piston 18 in known fashion.

Following the incising operation to be described in incising apparatus 1, each incised pole is discharged onto take off means 3 which comprises a cradle structure 26 having angularly arranged supporting rollers 27 rotatably mounted thereon. The rollers of cradle 26 are supported by a fixed vertical post 28, positioned therebeneath, to receive an incised pole from the incising apparatus 1. A hydraulic cylinder 29 is positioned adjacent one edge of the cradle to permit lateral tilting of the cradle for a purpose to be described.

Take off means 3 also includes a vertically adjustable cradle structure 31 supported on a movable dolly 32 which travels on a pair of spaced tracks 33 which are located in alignment with tracks 17 of the infeed means 2. Dolly 32 is selectively movable toward or away from the incising apparatus by means of a reversible hydraulic drive motor 34 and drive cable 36 in the same manner described previously for dolly 16. Cradle structure 31 on dolly 32 has a V-shaped support 37 mounted thereon which is vertically adjustably supported by a hydraulic cylinder 38 and its associated piston and rod. Additionally, a second hydraulic cylinder 39 is provided on the dolly in association with the support 37 to permit lateral tilting of the support as required. The respective hydraulic cylinders of the take off means may be selectively actuated in known fashion from any suitable source of hydraulic fluid.

Adjacent the dolly tracks 33 and extending generally normal thereto are a pair of supporting rails 41 onto which incised poles may be placed by tilting the rollers 27 and support 37 of the cradle structures 26 and 31. In this connection, the supporting rails 41 slope downwardly away from the cradles so that the incised poles may roll under the effects of gravity toward a discharge end of the rails at which location pole stops 42 are provided to arrest rolling movement of the poles until they may be removed from the rails in any suitable fashion.

It should be understood that poles are introduced in sequence by the infeed means 2 into the main incising apparatus 1 in which incising of any predetermined portion or all of the full length of a given pole is effected. As will be described, movement of a given pole through the incising apparatus 1 is effected by mechanism provided in such apparatus. Following such pole incising, and discharging thereof to the take off means 3, a subsequent pole to be incised is introducible into the apparatus by the infeed means 2. In this regard, it should be understood that the leading end of a second pole may be introduced into the incising apparatus 1 while the trailing end of a preceding pole is still being handled therein and, if desired, a substantially unbroken chain of poles to be incised may be passed to and through the incising apparatus in an efficient and generally continuous operation. Preferably all operative steps of the incising operation, including infeeding, incising, and take off, may be controlled and regulated by a single machine operator standing at a suitably located control console, generally designated 46 in FIG. 4.

The subject apparatus is designed so that each pole to be incised may be moved generally in step by step fashion through the incising apparatus without rotation of the pole about its longitudinal axis. In this connection, by thus obviating rotation of the pole during incising, problems encountered in locating the axis of rotation for those poles which have a non-straight longitudinal configuration are precluded. To this end, the incising apparatus employs a plurality of incising elements arranged in a predetermined pattern in generally circular fashion surrounding the longitudinal axis of the apparatus along which each pole to be incised is moved. The incising elements when actuated move in a generally radial direction toward the axis of the apparatus and are forced by suitable mechanism to be described into the pole generally in unison. Thus a predetermined section of a pole may be simultaneously incised about its full periphery. By repeating the incising operation as often as required or desired, the full length of a pole, or any desired portion of its length, may be incised.

Also, by moving the incising elements in a generally radial direction, the deep incising desired may be readily effected because incising elements possessing adequate length to effect such deep incising may be employed. This is in distinction to prior known incising machines which employ rotatable incising wheels which are rotated over the pole being incised. Such known rotating wheels can employ incising teeth of only comparatively short lengths and as a result the desired deep and clean incising holes currently required by strict user specifications are not obtainable therewith. With the subject apparatus the depth of incised holes produced in a given pole is limited generally only by the strength of the material employed to make the incising elements, the nature and condition of the wood of the pole being incised, and the size of the holes to be formed therein. In this regard, when the incising elements of this invention are withdrawn from a pole, the holes formed thereby remain essentially open and unrestricted, thereby greatly facilitating and enhancing the impregnation of the pole by a suitable preservative.

The incising elements of the apparatus of this invention are mounted in a predetermined pattern on a movable incising head. In the preferred embodiment illustrated, two substantially identical and cooperable incising heads, identified by numerals 51 and 52 and designated generally by the rings shown in phantom lines in the schematic showing of FIG. 4, are employed. As will be described hereinafter, each of such incising heads is movable relative to the other in a direction extending generally longitudinally of the axis of the apparatus.

It should be understood that each pole being incised passes generally through the center of the incising heads along the axis of the apparatus and the incising operations are performed thereon in sequence by the incising elements carried by each head. In this regard, the individual incising elements are movable generally in unison in a generally radial direction with respect to the axis of the apparatus.

Figure 2:
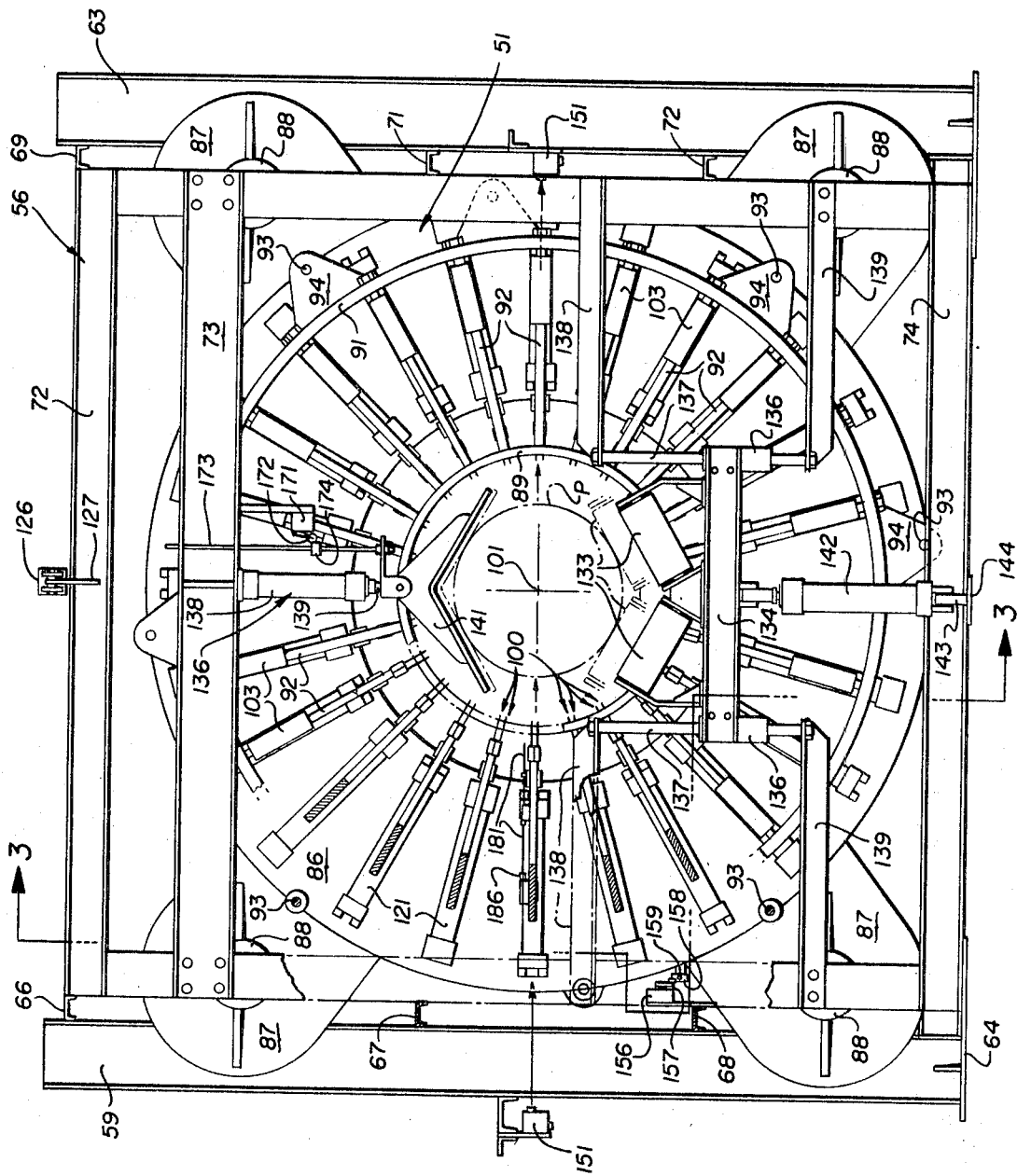
FIG. 2 is a front elevational view of the main incising portion of the apparatus with parts thereof cut away for purposes of clarity of illustration.
Figure 3:
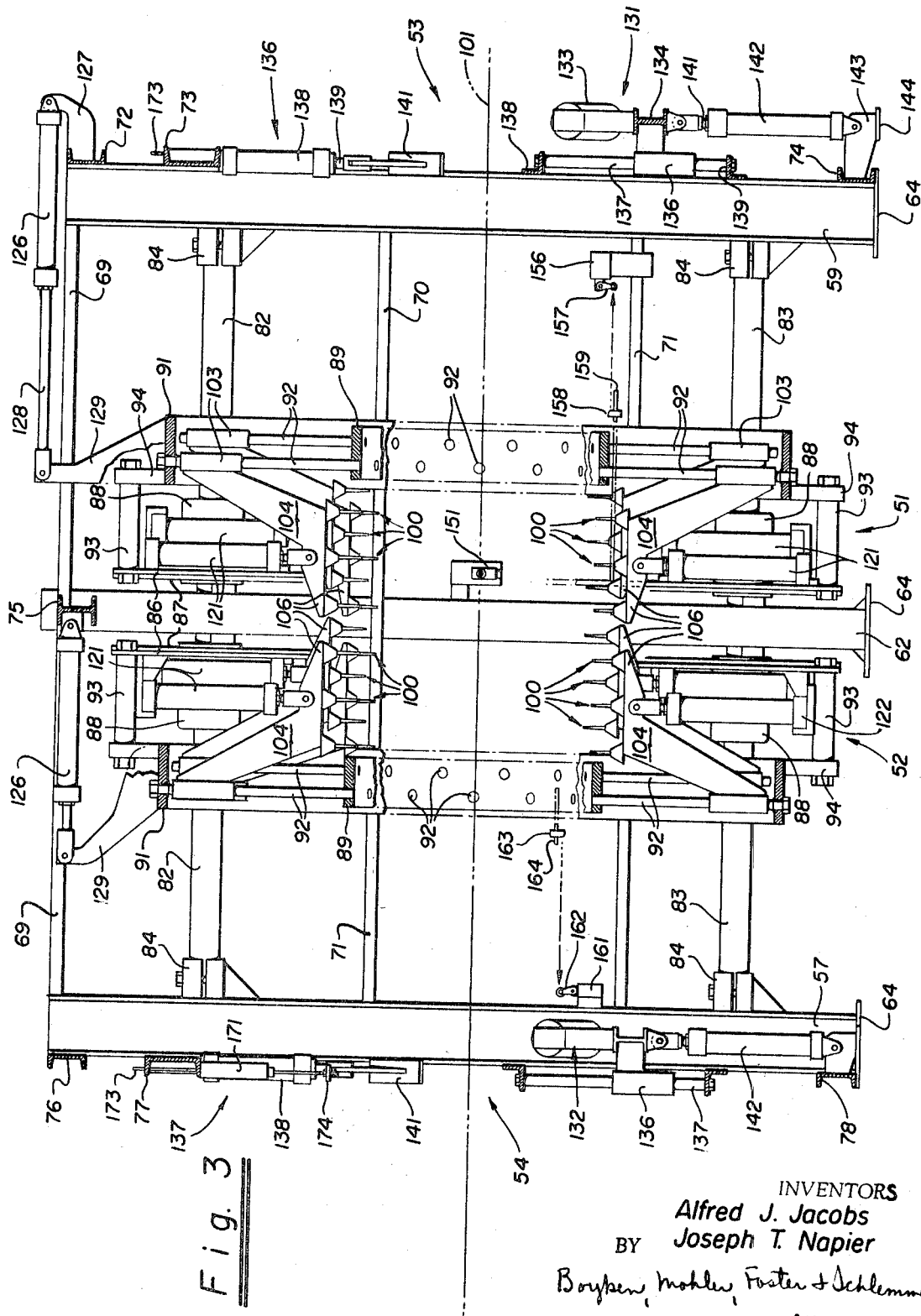
FIG. 3 is a vertical sectional view through the apparatus taken generally in the plane of line 3—3 of FIG. 2.

Reference is now directed to FIGS. 1, 2 and 3 which illustrate details of construction of the respective incising heads 51 and 52 and the supporting framework therefor. In this regard the incising heads are generally identical, but are reversely oriented relative to each other to permit a continuous and uniform incising pattern to be applied to a pole. The details of only one head will be emphasized but it should be apparent from the drawings that the other head is essentially the same in construction and function.

Each incising head is located at an incising station, with head 51 being located adjacent the entrance end 53 of the apparatus and head 52 being located adjacent the exit end 54 of the apparatus as seen in FIGS. 1 and 3. Each head is movable longitudinally relative to the other head and relative to the respective entrance and exit ends of the apparatus adjacent which it is positioned.

The heads are mounted for such longitudinal movement on a rigid metal framework, generally designated 56, which comprises a series of upright parallel longitudinally spaced standards 57, 58 and 59 at one side of the apparatus and 61, 62 and 63 at the other side of the apparatus. Each such standard has a foot plate 64 secured thereto by welding or other suitable means for supporting the framework on a supporting surface, such as the floor foundation of a work building in which the apparatus is installed for operation. The framework 56 further includes a series of vertically spaced longitudinally extending horizontal braces 66, 67 and 68 welded or otherwise suitably secured to the standards at one side of the apparatus and similar braces 69, 70 and 71 similarly secured to the standards at the other side of the apparatus.

Another series of vertically spaced transversely extending horizontal braces 72, 73 and 74 extend laterally between the standards 59 and 63 at the entrance end of the apparatus, while a similar series of vertically spaced transversely extending braces 76, 77, 78 similarly extend laterally across the exit end of the apparatus. An overhead brace 75 extends transversely across the top of the apparatus. All such braces are welded or otherwise suitably secured to their associated standards. The framework thus has an open work configuration permitting ready access to the components of the incising heads for service and maintenance thereof as required.

Support and guide means for the respective incising heads extend longitudinally of the respective incising stations along opposite sides of the apparatus so that the heads are longitudinally movable relative to the axis of the apparatus. Such support and guide means comprise parallel pairs of upper and lower longitudinally extending bearing shafts, designated 79 and 81 at one side of the apparatus and 82 and 83 at the other side thereof. As best seen in FIG. 3, each of such bearing shafts is supported in a suitable mounting bracket generally designated 84 which is bolted or otherwise suitably secured to the respective upright standards of the apparatus framework.

As seen in FIGS. 1 and 2, exemplary mounting head 51 comprises a generally circular apertured mounting plate 86 which has equally spaced about and projecting generally radially from its periphery four enlarged bearing plates, each of which is designated 87 and each of which is welded or otherwise suitably secured to the mounting plate. Each bearing plate 87 in turn has an enlarged bearing housing 88 projecting longitudinally therefrom which surrounds an associated one of the respective bearing shafts 79, 81, 82 or 83. Although not specifically illustrated, it should be understood that in each such bearing housing are positioned suitable heavy duty ball bearing races or equivalent bearing structure which permit movement of the incising head over the respective bearing shafts with a minimum of frictional interference.

It should also be understood that corresponding reference numerals are used to identify corresponding elements of both incising heads and that the only important distinction between the two heads is their reverse orientation relative to a central reference plane extending transversely of the apparatus midway between its entrance and exit ends as defined by the middle upright standards 58 and 62 of the framework.

Incising head 51 further includes spaced concentric inner and outer supporting rings 89 and 91 respectively between which a series of generally radially extending peripherally spaced guide rods 92 extend. Such guide rods may be welded, threaded or otherwise securely engaged in apertures selectively provided in the respective inner and outer supporting rings. It should be noted, as perhaps best seen from FIGS. 3 and 5, that each pair of adjacent guide rods are spaced not only peripherally from each other but also longitudinally from each other. This peripheral and longitudinal offsetting effects proper orientation of the incising elements to be described which in turn produces the preferred incising pattern obtained with this apparatus.

The respective inner and outer supporting rings are positioned concentrically of each other but are spaced longitudinally and coaxially of the mounting plate 86 toward an adjacent end of the apparatus by means of a series of peripherally spaced mounting bolt structures 93. Suitable spacer sleeves surround the bolt structures and are interposed between the mounting plate 86 and ears 94 welded or otherwise secured to the outer supporting ring 91 which project generally radially therefrom. The number of such mounting ears and bolt structures with associated spacers employed may vary in accordance with the overall size of the apparatus. The spacer sleeves provided on the respective bolt structures maintain the outer supporting ring, and thereby the inner supporting ring as well, spaced a predetermined distance longitudinally from the mounting plate when the nuts employed in conjunction with the mounting bolts are tightened.

One or more incising elements 100 is movably supported on each of the guide rods 92 of incising head 51 for movement on such guide rod in a generally radial direction relative to the longitudinal axis of the apparatus, generally designated 101 in FIG. 3. It is generally along such axis 101 that a pole to be incised is movable during incising operation of the apparatus. In the preferred embodiment illustrated, three incising elements 100 are movably supported on each supporting rod. It should be understood, however, that the number of such elements supported on each rod, and their orientation relative to adjacent elements, may be altered as required to impart numerous desired incising patterns to a pole. But, as will be described, the incising elements are oriented on the incising head in the preferred embodiment shown to produce a highly effective generally diamond shaped incising pattern in an incised pole.

Each guide rod 92 has positioned thereon and surrounding the same a mounting sleeve 103 from which projects, in a generally inwardly and substantially radial direction, a mounting bracket 104 which preferably is welded to its associated mounting sleeve 103, as perhaps best seen in FIGS. 3 and 5. Each mounting bracket is generally L-shaped and terminates in an inner foot portion 106 which extends generally longitudinally of the apparatus in a generally radial plane. A series of incising element receiving sockets 107 are welded or otherwise suitably secured to the inner edge of each foot portion 106 and an incising element 100 is received in a suitable bore 108 provided in each socket as best seen in FIG. 7.

Each incising element 100 constitutes an incising tooth having a generally cylindrical upper portion 109 received in the bore of an associated socket. Such cylindrical portion is provided with a pair of opposite indentations 111 as seen in FIG. 7 in which a set screw 112 is seatable to insure firm retention of the tooth in its associated socket. Each incising tooth is of elongated configuration of sufficient length to produce the deep incising for which the subject invention was designed. In this regard, the incising teeth and receiving sockets therefor are shown substantially full size in FIGS. 7 through 9.

Figure 12:
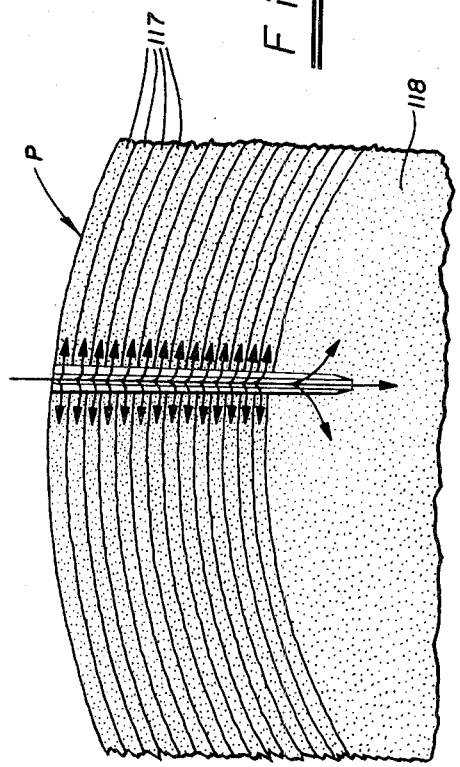
FIG. 12 is a sectional view on an enlarged scale relative to FIG. 11 taken in the plane of line 12—12 thereof showing the generally unrestricted nature of the incised hole formed therein by each of the incising elements.

Each tooth is further defined by a thin tapered body 113 which has a generally diamond shaped cross sectional configuration which decreases in size from a location adjacent the cylindrical upper end thereof toward the tip end 114 thereof. Such tip end is defined by a cutting point of hollow concave or crescent configuration which has two cutting edges 116 spaced thereacross. The body configuration and cutting point of each tooth are designed to cut cleanly through and physically sever the minimum number of fibers of a pole being incised while at the same time effecting spreading of the fibers the maximum amount so that a relatively clean and unrestricted hole is left in the pole when the tooth is withdrawn. Such a desirable open and clean hole is shown in FIG. 12 and permits rapid flow of a preservative radially into the pole and laterally from the hole into and between the respective layers of the sap wood and heart wood, as illustrated by the arrows in FIG. 12. Also, as noted previously, each such hole facilitates effective drying of the pole in a seasoning operation.

Referring to FIGS. 6 and 9, it should be noted that adjacent incising teeth carried by each of the mounting brackets 104 are spaced not only longitudinally from each other but are offset laterally and reversely oriented relative to each other. Furthermore, because adjacent supporting rods 92 on which the sets of teeth are mounted are longitudinally offset in supporting rings 89 and 91, the incising teeth of each set are longitudinally spaced or staggered relative to the corresponding teeth of an adjacent set. This spacing or offsetting of adjacent sets of teeth in both the lateral (peripheral) and longitudinal directions, as well as the lateral and longitudinal spacing and offsetting of adjacent teeth in each individual set, is specifically designed to impart a predetermined offset or staggered incising pattern to a pole, which pattern minimizes or obviates the possibility of pole checking and also decreases pole strength the minimum possible amount.

Figure 11:
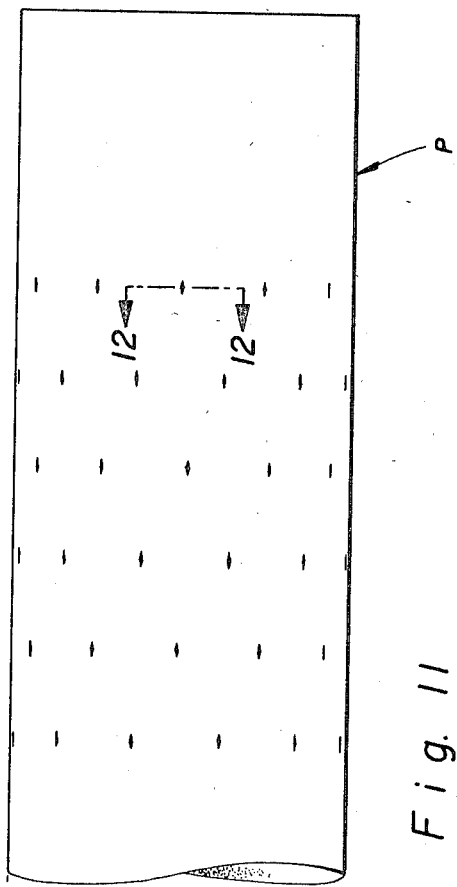
FIG. 11 is a plan view of a portion of an incised pole showing the preferred incising pattern applied thereto.

In this regard, referring to FIG. 11, it will be noted that the teeth of the preferred embodiment of the apparatus illustrated impart a generally diamond shaped pattern to a pole incised thereby. That is, each series of any four adjacent teeth taken at any section on the periphery of the pole together define a diamond if lines are extended between such series of four teeth. In this regard, however, it will be further noted that the holes which define opposite longitudinal corners of each diamond are not in direct line with each other because of the offset relationship of adjacent teeth in each set of teeth carried by the incising head. It has been found that this generally diamond shaped incising pattern, coupled with the generally diamond shaped hole imparted by each tooth, obviates or greatly minimizes undesirable checking of incised poles while maintaining maximum natural pole strength.

Figure 10:
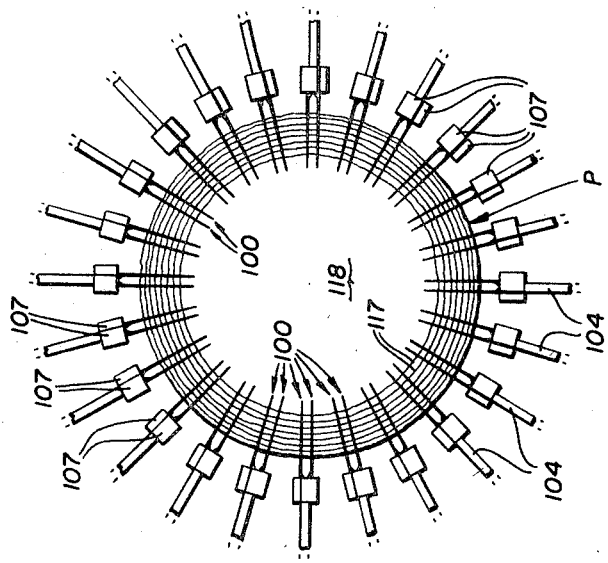
FIG. 10 is a generaly schematic view showing generally simultaneous penetration of a pole about its full periphery by a series of incising elements of an incising head of the subject apparatus.

Referring to the generally schematic showing of FIG. 10, it should be understood that all teeth 100 carried by an incising head are movable generally in unison and in a generally radial direction inwardly into a pole P being incised thereby. As noted previously, the teeth are of a length sufficient to penetrate the outer sap wood layers 117 of the average pole and to extend a substantial distance into the heart wood core 118 thereof.

The mechanism provided for moving the tooth mounting brackets 104 and sets of teeth 100 carried thereby on each of the mounting heads comprises a hydraulic system made up of a plurality of hydraulic cylinders 121, each of which is operatively connected with an associated tooth mounting bracket 104 as perhaps best seen in FIG. 3, and shown schematically in FIG. 4. Each such hydraulic cylinder extends generally radially of the apparatus and is secured at its upper end to the mounting plate 86 of the incising head by means of a cylinder support 122. A piston of conventional construction (not shown) is movably positioned in each such cylinder and a piston rod 123 projects beyond the cylinder from the inner end of each such piston which is pivotally connected with an associated foot portion of a tooth mounting bracket 104 by means of a pivotal bolt or pin connection 124, as best seen in FIG. 5. Thus, upon hydraulic fluid being introduced into a cylinder on the outer end of the piston contained therein, an associated tooth mounting bracket 104 and the incising teeth carried thereby will be hydraulically moved generally radially to force the teeth into a pole positioned within the inner ring 89 of the incising head.

Preferably all of the cylinders of the incising head have hydraulic fluid introduced thereinto simultaneously from a common hydraulic reservoir, schematically illustrated at 120 in FIG. 4, so that all the incising teeth of such head may be generally simultaneously forced into a section of pole positioned within the incising head. Thus such pole section may be incised about its full periphery in a simple one step operation. In this regard, because the pistons in the respective cylinders 121 are subjected to hydraulic pressure from a common source, some slight time lag may result between the time the teeth actuated by one cylinder contact the pole relative to the time the teeth actuated by another cylinder contact the pole. However, such condition is not detrimental and permits relatively inexpensive and simple hydraulic circuitry to be employed. It should be understood, however, that none of the teeth will enter the pole until all teeth are in contact therewith. That is, all teeth must encounter equal resistance until pressure is uniformly built up within the system, at which time all teeth are forced into the pole generally in unison.

The respective pistons in cylinders 121 for each incising head may be actuated generally in unison as described from the control console 46 through a suitable hydraulic pump 125, and drive motor 125' therefor, which introduces hydraulic fluid into each cylinder into contact with the outer end of the piston contained therein.

It should of course be understood that similar control functions may be governed by the control console to effect generally simultaneous introduction of hydraulic fluid into each cylinder into contact with the inner end of the piston contained therein to effect generally simultaneous withdrawal of the respective incising teeth from a pole incised thereby. While the hydraulic circuitry governing the cylinders 121 has not been specifically illustrated, it should be understood that any suitable circuitry capable of actuating a plurality of pistons in unison may be employed.

It is another preferred feature of this apparatus that each incising head is capable of performing the additional function of moving a pole in step fashion through the apparatus as a series of incising operations are performed thereon in sequence by the respective incising heads. In this regard, preferably each incising head is moved longitudinally of its incising station toward the exit end of the apparatus while its incising teeth are still engaged in the pole and before withdrawal thereof. That is, as the incising teeth of a given head are engaged about the periphery of a predetermined section of the pole (as shown schematically in FIG. 10) the entire incising head is moved as a unit from one end of its incising station towards the other end thereof to thereby advance a pole a predetermined distance governed by the limit of travel of the incising head on the bearing shafts 79, 81, 82 and 83.

A simple mechanism for effecting such selective movement of each incising head comprises a separate longitudinally extending hydraulic cylinder 126 mounted generally above each incising head. As seen in FIGS. 1 and 3, the cylinder 126 for the incising head 51 adjacent the entrance end of the apparatus is mounted above the apparatus framework by means of an L-shaped bracket 127 which projects outwardly and upwardly from the upper brace 72 which extends transversely of the apparatus across its entrance. A piston (not shown) is located in cylinder 126 and a piston rod 128 projects from cylinder 126 which in turn is pivotally connected with an upstanding plate 129 projecting generally radially from the outer supporting ring 91 of the incising head. Thus, upon hydraulic fluid being introduced against the piston in cylinder 126 in known fashion, the piston rod 128 may be extended or retracted relative to the cylinder to move the incising head from a position closely adjacent the entrance end 53 of the apparatus to the position shown in FIG. 3 in which the incising apparatus is closely adjacent the second incising head 52 at the second incising station, and vice versa. The stroke of the piston in the embodiment illustrated governs the extent of travel of the incising head but other travel limiting means may be employed if preferred.

The cylinder 126 which actuates the second incising head 52 is similarly operated and similarly mounted, except that a special L-shaped bracket 127 is unnecessary. One end of this latter cylinder is directly connected with the overhead brace 75 which extends transversely of the apparatus, as seen in FIG. 3.

It should be understood that both incising head actuating cylinders 126 are activated and controlled as required from the control console 46 through pump 125 and suitable hydraulic circuitry.

Still referring to FIG. 3, it will be noted that the incising head 51 is shown at the end of its stroke with its piston rod 128 fully extended, while the other incising head 52 has its piston rod 128 fully retracted so that the head is positioned to begin its stroke. Head 51 shown at the end of its stroke is ready to be returned to its starting position closely adjacent the entrance end of the apparatus so as to be ready to incise another section of a pole. As will be described hereinafter, the incising heads are operated in timed sequence with each other to incise and move a given pole in step fashion past the respective incising stations until any predetermined portion or the full length of the pole is incised as required to meet particular standards.

Means are provided in conjunction with the incising heads to locate each predetermined section of the pole to be incised at each of the incising stations as required and to maintain the pole temporarily immobile while the teeth of the respective incising heads are engaged therewith. That is, means for supporting the pole for movement through the apparatus is provided, as is means for periodically clamping and unclamping the pole as a given incising head is operating to incise a predetermined section of the pole.

As seen schematically in FIG. 4 and in detail in FIG. 3, the pole supporting means comprises a pair of vertically adjustable cradle structures 131 and 132 at the entrance and exit ends respectively of the apparatus. Each cradle structure is generally identical in construction and the structure provided at the entrance end will be described with reference to FIGS. 1 and 2. Such structure comprises a pair of supporting rollers 133 angularly arranged in generally V-fashion on a supporting bracket 134 which has its opposite ends connected by cylindrical slide members 136 with a pair of laterally spaced upright guide rods 137 which extend in parallel relationship between a pair of vertically spaced upper and lower frame members 138 and 139 extending inwardly from each of the upright standards 59 and 63 at the entrance end of the apparatus. The bracket 134 in turn is supported by means of a piston rod 141 which projects from a piston (not shown) contained in a hydraulic cylinder 142 which has its lower end mounted on a base bracket 143 and a base foot 144 resting on the supporting surface for the apparatus. Upon introduction of hydraulic fluid into piston 142, the supporting rollers 133 may be selectively raised or lowered as the slide members 136 move vertically on the guide rods 137.

Preferably the cradle structures 131 and 132 at the opposite ends of the apparatus are controlled from the control console 46. Such cradle structures are adjusted vertically to orient the axis of the pole to be incised as closely as possible in conformity with the longitudinal axis 101 of the apparatus. In this regard, exact centering precision of the pole axis is not required and normally may be accomplished visually by the apparatus operator at the control console. However, if more sophisticated control and centering is desired, automatic means may be employed for effecting such precise centering.

The hydraulic cylinders of the respective supporting cradle structures may be actuated from the common hydraulic fluid source 120 through pump 125, or a separate source may be employed if preferred. The hydraulic circuitry in this regard also has been omitted from the drawings but may take any conventional form.

As mentioned previously, the apparatus also includes means for maintaining the pole being incised temporarily immobile while the incising teeth of a given incising head are forced thereinto. Such means in the embodiment illustrated comprises mechanism for selectively clamping and unclamping the pole against the respective supporting cradles 131 and 132 at the entrance or exit means of the apparatus. As seen in FIGS. 3 and 4, such clamping mechanism at the entrance end is generally designated 136 while the corresponding mechanism at the discharge end is generally designated 137. Because of the identical nature of the two clamping mechanisms, that mechanism shown at the entrance end will be described with reference to FIG. 2.

Clamping mechanism 136 comprises a hydraulic cylinder 138 mounted in depending fashion from the horizontal brace 73 extending across the entrance end of the apparatus. Positioned in the cylinder is a piston (not shown) with which a piston rod 139 is operatively connected. From the lower end of piston rod 139 a generally inverted V-shaped clamping member 141 is pivotally connected. Upon introduction of hydraulic fluid into the cylinder against the piston, the clamping member 141 may be moved selectively downwardly into clamping contact with a pole positioned in the apparatus and supported on the supporting cradle 131, or moved upwardly to release such clamping contact with the pole.

Because the respective clamping mechanisms 136 and 137 are mounted generally directly above the supporting cradles 131 and 132 at the respective ends of the apparatus, clamping pressure may be applied to a pole substantially directly in line with the supporting cradles so that the pole may be maintained securely immobile as required. Because the clamping members 141 and the rollers 133 of the supporting cradles are cooperably V-shaped, a pole clamped therebetween may be snugly maintained against rotation while the same is being temporarily held stationary.

Introduction or exhaust of hydraulic fluid relative to the respective hydraulic cylinders 138 of the clamping mechanisms may be controlled through the control console 46 as required. The hydraulic circuitry in this regard is conventional and has not been illustrated.

It should be understood that the respective clamping members 141 may be moved downwardly into contact with a pole supported on the associated supporting rollers 133 whenever it is desired to hold the pole immobile while the teeth of a given incising head are being forced into the pole or are being retracted therefrom. Of course, before longitudinal travel of the respective incising heads engaged with the pole is begun, the respective clamping members 141 are raised to unclamp the pole so that longitudinal movement of the pole by a given incising head as described previously may be effected. Thus, the clamping mechanisms 136 and 137 are actuated in unison but in timed sequence with the incising and travel functions performed by their associated incising heads.

Provided in conjunction with the respective clamping mechanisms and incising heads are safety control means, to be described later, which insure proper sequential clamping and unclamping at the correct intervals to permit each of the two incising heads to incise and longitudinally move a pole in step fashion without opposition from the clamping mechanism or incising head located at the other incising station and adjacent an opposite end of the apparatus.

By way of illustration one complete cycle of operations as performed by the subject apparatus will be described, taking reference to the schematic showings of FIG. 4.

A pole P is first withdrawn from the infeed means 2 and one end thereof introduced thereby into the entrance end of the apparatus and supported therein by supporting means 131. In this regard, the pole may be fed either tip end or butt end first. In either event, the pole axis is generally aligned with the apparatus axis and a predetermined section of the pole is located within the first incising head 51 which is positioned closely adjacent the entrance end of the apparatus at one end of the first incising station. When the pole is thus positioned the clamping mechanisms are actuated and their clamping members 141 are moved downwardly to maintain the pole temporarily immobile. The incising teeth 100 of the first incising head 51 are then actuated in unison and are forced into the predetermined section of the pole located in line with the incising head.

When the incising teeth are thus engaged, the clamping members 141 are raised and the incising head is moved longitudinally from one end of the first incising station toward the other end thereof which lies nearest the exit end of the apparatus. Such movement carries the pole longitudinally through the apparatus past the first incising station.

When the first incising head reaches the end of its travel, the second incising head, positioned at the end of its incising station which lies nearest the entrance end of the apparatus, is ready to incise another predetermined section of the pole. At this stage the two incising heads are oriented generally as shown in FIG. 3.

No clamping of the pole by the clamping mechanisms is required at this stage because the teeth of the second incising head are forced into the pole while the teeth of the first incising head are still engaged. Thus the pole is held immobile by the respective teeth. After the teeth of the second head are engaged the teeth of the first head are withdrawn and the first head is returned to its initial position adjacent the entrance end of the apparatus. Generally at the same time, the pole is moved longitudinally of the apparatus in conjunction with movement of the second incising head. When the second incising head reaches the end of its travel adjacent the exit end of the apparatus, the clamping mechanisms are again activated and the incising teeth of the second head are withdrawn as the teeth of the first head are reengaged, all in conjunction with clamping of the pole by the clamping mechanisms thereby completing a full sequence of operations of the apparatus. Such sequence is repeated as often as necessary until the desired portion of the pole is incised in a continuous pattern. It should be noted that the sequences of incising operations are performed without attendant rotation of the pole about its longitudinal axis.

Following incising to the extent desired, the incised pole is discharged onto the take off means 3 and moved thereby from the incising apparatus. The pole is then deposited onto the rails 41 for subsequent transfer to a preservative impregnation station.

The above described sequence also will be described briefly with respect to the schematic showings of FIGS. 13A through 13G. In FIG 13A the respective incising heads are shown at their extreme positions with head 51 being located and ready to incise a first predetermined section of a pole and with head 52 being located in its orientation after a preceding pole has been incised and discharged from the apparatus. Head 51 is first actuated and the incising elements thereof are forced into the pole as seen in FIG. 13B. Thereafter head 51, while its incising teeth are still engaged in the pole, is moved longitudinally to move the pole one step past the first incising station.

Generally simultaneously with movement of head 51 the second head 52 is returned to an initial position in which it is ready to incise another predetermined section of the pole, as seen in FIG. 13C. In conjunction with forcing the incising teeth of head 52 into the pole, the teeth of head 51 are withdrawn, as seen in FIG. 13D, and the two heads thereafter are moved generally simultaneously in opposite directions to move the pole another step through the apparatus past the second incising station and to return the head 51 to its initial position ready to incise a third predetermined section of the pole, as seen in FIG. 13E. Thereafter, the teeth of head 52 are withdrawn from the pole and, as seen in FIGS. 13F and G, the sequence is repeated.

As mentioned previously, safety control means are provided in conjunction with the two incising heads to preclude movement of the heads in opposite directions while the teeth of both heads are engaged with a given pole. In this regard, while the teeth of both heads are shown fully engaged in FIG. 5, it should be understood that this showing illustrates the relationship between the heads when the teeth of the first head are about to be withdrawn from the pole as the teeth of the second head reach their full depth in the pole.

By providing the duplicate incising head construction described, quite rapid incising of elongated poles may be effected in step fashion. The extent to which each section of pole is incised by each head is determined by the location of the incising teeth on the head. By way of illustration, incising heads having teeth arranged to cover an eighteen inch longitudinal section of a pole have been found suitable. In this regard, movement of the pole in step increments of eighteen inches by each of the incising heads results in a regular incising pattern being applied to a pole. Because the two heads are operated in conjunction with each other in sequential fashion as shown in FIGS. 13A through 13G, an unincised section of pole is brought into alignment with each of the repective heads upon movement of the other of such heads. Furthermore, because the pole is moved through the apparatus generally without rotating the pole about its longitudinal axis, the incising pattern imparted to each predetermined section of the pole by the first incising head is continued by the second incising head, and vice versa, so that an uninterrupted pattern is imparted throughout the length of the pole about its full periphery as seen in FIG. 11.

It should be understood that if desired, the sequence of operations performed by the respective components of the apparatus as described may be regulated manually by an operator at the control console. However, the apparatus lends itself to fully automatic operation and such fully automatic operation is preferred for speed and economy. In this latter regard, a machine operator is present at the control console to insure effective operation but his presence is not required at all times because the successive operations and step by step movement of each pole of a series of poles through the apparatus may be automatically regulated and controlled. In this regard, the various electrical circuitry necessary to effect such automatic operation of the hydraulically actuated components of the apparatus has not been illustrated as such circuitry is within the knowledge of a skilled engineer. The same is true of the necessary hydraulic circuitry.

As mentioned previously, the apparatus preferably includes safety control means for insuring proper functioning of the respective components of the apparatus. In this regard, preferably a master control is provided which precludes any incising operation of the apparatus unless a pole is positioned therein in incising position, or unless the master control is overridden. In this regard, a master control found suitable comprises opposite electric eye structures generally designated 151, as seen in FIGS. 2 and 3, which are supported on the upright middle standards 58 and 62 of the apparatus framework. The electric eye structures direct a light beam in known fashion transversely across the apparatus generally in the mid portion thereof in line with the longitudinal axis of the apparatus along which the pole to be incised will be moved. Thus, until the leading end of the pole to be incised breaks the elecric beam, the respective incising heads and clamping mechanisms will remain inoperable due to a suitable electrical control circuit regulated by the electric eye which governs operation of the hydraulic systems for the incising heads and clamping mechanisms. Any suitable control is provided to override the control function of the electric eye structures so that the apparatus may be actuated in the absence of a pole as may be required for servicing and maintenance thereof.

In this connection, referring to the sequential showing of FIGS. 13A through 13G in conjunction with FIG. 3, it will be noted that the leading end of a pole must pass a substantial distance into the apparatus before it breaks the beam of the electric eye structures. Thus the first incising head performs a first incising operation at a location spaced inwardly from the leading end of the pole. The incising operation performed most closely to the pole leading end is performed by the second incising head as seen in FIG. 13D.

The apparatus also includes control means to preclude movement of the first incising head 51 longitudinally toward the exit end of the apparatus while the incising teeth of the second head 52 are engaged in a pole, and vice versa. Such control means preferably is electrically operated and works through conventional electrical circuits (not shown) to preclude such conflicting longitudinal movement of the respective incising heads. In this regard, as perhaps best seen in FIGS. 1 and 3, a limit microswitch 156, including a trip lever 157, is mounted on the horizontal brace 71 along one side of the apparatus for engagement by a contact 158 adjustably positioned on a switch rod 159 secured to the mounting plate 86 of the first incising head and projecting longitudinally thereof. A similar limit microswitch 161 including a trip lever 162 is mounted adjacent the exit end of the apparatus on upright standard 57 for engagement by a contact 163 adjustably mounted on a switch rod 164 secured to the mounting plate 86 of the second incising head and projecting longitudinally therefrom.

Each of the limit switches functions via suitable and conventional electrical circuits to override operation of the incising head opposite therefrom while the incising teeth of the first mentioned head are engaged with a pole. That is, when incising head 51 is positioned adjacent the entrance end of the apparatus so that its switch contact 158 closes the circuit regulated by microswitch 156, the opposite incising head 52 may not move longitudinally of the apparatus. However, when the circuit regulated by switch 156 is open, such movement of head 52 is electrically permitted. Similarly, when incising head 52 is located adjacent the exit end of the apparatus, the circuit controlled by microswitch 161 is closed so that head 51 may move longitudinally toward the exit end of the apparatus. Only when the heads are in the position shown in FIG. 3 may both their respective incising teeth be engaged in the pole. In this regard, in that position the teeth of head 51 are being withdrawn while the teeth of head 52 are being inserted into the pole.

Further control means are provided in conjunction with the clamping mechanisms of the apparatus to correlate vertical movement of the clamping mechanisms with longitudinal movement of the incising heads. As seen in FIGS. 2 and 3 such control means are the same at each end of the apparatus and comprise a limit microswitch 171 having a trip lever 172 mounted thereon. Projecting upwardly from a suitable bracket on the clamping member 141 of the clamping mechanism is a switch rod 173 which extends upwardly through suitable guide openings provided in the frame member 73 of the apparatus framework. Adjustably mounted on switch rod 173 is a contact member 174 adapted to engage the trip lever 172 of the limit switch 171 when the clamping mechanism is in the fully raised position.

The respective limit switches 171 provided in conjunction with the entrance and exit end clamping mechanisms are connected through suitable and conventional electrical circuits to override the operation of the incising heads unless the clamping members 141 are fully raised. That is, neither of the incising heads is longitudinally movable unless and until each limit switch 171 of each clamping mechanism is contacted by a contact member 174 so that the circuits regulated by such switches are closed to permit actuation of the hydraulic circuits which actuate the respective incising heads. Thus any possibility of a pole being moved longitudinally by an incising head while the clamping mechanisms are still engaged with the pole is positively precluded.

A final important feature of this apparatus comprises means to limit the depth to which the respective incising teeth of the two incising heads may be forced into the pole being incised. Such depth limiting means is desirable to preclude engagement of the teeth receiving sockets 107 with the periphery of the pole being incised. Thus unsightly and undesirable marking or indentation of the pole by the enlarged sockets 107 is precluded and the only change in the appearance of the pole is produced by the small incised holes.

Depth limiting means is provided in conjunction with each of the incising heads, as is best shown in FIG. 5. To this end each incising head is provided with a detecting finger 181 which is mounted in a guide bracket 182 secured to a preselected one of the incising tooth mounting brackets 104 for slidable movement in a generally radial direction in such guide bracket. The detecting finger 181 is normally urged inwardly towards the axis of the apparatus by means of a spring surrounding the finger and interposed between bracket 182 and a step 184 secured to the finger. Another stop 185 is adjustably mounted on the finger above the bracket 182 and thereby limits the distance the tip of the finger may project toward the axis of the apparatus. At its upper end the detecting finger is provided with an adjustable switch contact 186 intended to engage a trip lever 187 of a limit microswitch 188 which also is mounted on the incising teeth mounting bracket 104. A similar detecting finger depth limiting arrangement is provided in conjunction with the first incising head as seen at the right of FIG. 5 generally in phantom lines.

The purpose of such limiting finger is to restrict the depth to which the incising teeth of each incising head may be forced into the pole being incised, which thereby also precludes contact of the tooth receiving sockets 107 with the pole being incised.

Because each finger 181 is normally spring urged inwardly toward the axis of the apparatus, when an incising head forces incising fingers into a pole, the tip end of the finger 181 contacts the periphery of the pole and is urged upwardly in FIG. 5 (radially outwardly) as the incising teeth progressively enter the pole. When the contact 186 at the upper end of the finger contacts the trip lever 187 of its associated limit switch, an electrical circuit is closed which overrides the hydraulic circuit which actuates movement of the incising teeth to preclude further inward movement of the incising teeth. Thus over insertion of the incising teeth into a pole is positively precluded. The maximum depth to which the teeth may be forced into a pole may be regulated by altering the location of the switch contact 186 on the finger 181.

Having thus made a full disclosure of a preferred embodiment of the apparatus of this invention, reference is directed to the appended claims for the scope to be afforded this invention. In this connection, it should be understood that the foregoing disclosure is intended to be illustrative rather than limiting and that modifications to the invention as disclosed in its preferred embodiment herein shown which come within the skill of those in the art to which this invention pertains are contemplated as being included within the scope of the appended claims.

We claim:
1. Apparatus for incising poles comprising:
(A) an elongated framework having an infeed end and a take off end,
(B) means on said framework for supporting a pole to be incised during movement therethrough,
(C) an incising head supported by said framework and defining a pole receiving opening,

(D) a plurality of elongated radially extending incising elements mounted on said head in circumferentially spaced relationship completely around said opening in a predetermined incising pattern for motion toward said opening and into a pole in said opening, (E) mechanism connected to said elements for reciprocating said elements along their longitudinal axes and for forcing said elements into a pole, (F) means on said framework for maintaining said pole temporarily immobile while said elements are forced into a predetermined section thereof to be incised thereby.

2. Apparatus for incising poles comprising
(A) a framework,
(B) means on said framework for supporting a pole to be incised longitudinally along an axis,
(C) an incising head supported by said framework,
(D) a plurality of elongated incising elements extending radially toward said axis and mounted on said head at equally spaced intervals circumferentially around said axis for motion radially of said axis,
(E) mechanism connected to said elements for so moving said elements and for forcing said elements into said pole,
(F) said incising head being mounted for selective movement thereof and of said pole with said elements on said head in incising condition longitudinally of said framework, the range of motion of said head extending from adjacent one end of said framework toward another end thereof, and
(G) means for effecting such selective movement of said incising head.

3. Apparatus for incising poles comprising:
(A) a framework,
(B) means on said framework for supporting a pole to be incised longitudinally along an axis,
(C) an incising head supported by said framework,
(D) a plurality of elongated incising elements extending radially toward said axis and mounted on said head at equally spaced intervals circumferentially around said axis for motion radially of said axis,
(E) mechanism connected to said elements for so moving said elements and for forcing said elements into said pole,
(F) a second incising head supported by said framework adjacent to and disposed longitudinally of said framework from said first mentioned incising head,
(G) a plurality of elongated incising elements mounted on said second head at equally spaced intervals circumferentially around said axis for motions and with extents substantially similar to that of said elements on said first head, and
(H) mechanism for so moving said elements of said second head.

4. The apparatus of claim 1 which further includes
(F) means in conjunction with the incising elements of said head for automatically regulating the depth to which said incising elements may be forced into said pole by said element moving mechanism to some predetermined depth less than the extent of said elements.

5. The apparatus of claim 1 in which
(F) said incising head is generally ring like in configuration so that a pole to be incised may be moved therethrough and surrounded thereby during such movement,
(G) said incising elements being arranged about said head for movement in a generally radial direction inwardly toward the longitudinal axis of said apparatus,
(1) said elements being spacedly arranged on said head to impart a generally diamond shaped incising pattern to a predetermined section of said pole aligned with said head about the full periphery thereof.

6. Apparatus for deep incising poles comprising
(A) a framework having entrance and exit ends for a pole to be incised by said apparatus,
(B) support and guide means extending longitudinally of said framework from adjacent said entrance and toward said exit end,
(C) first and second incising heads moveably mounted on said support and guide means and surrounding the longitudinal axis of said apparatus,
(D) means for selectively moving each of said incising heads in a longitudinal direction relative to said entrance and exit ends,
(E) means for supporting said pole for movement through said framework to and past said first and second heads,
(F) means for maintaining said pole temporarily and sequentially immobile when a predetermined section thereof is located in line with one of said heads so that such pole section may be incised thereby,
(G) each of said heads comprising
(1) an apertured mounting plate,
(2) spaced inner and outer supporting rings mounted on said plate generally coaxially with said longitudinal axis of said apparatus,
(3) a series of spaced guide rods extending generally radially between said inner and outer rings,
(4) incising elements moveably supported on said guide rods for movement therealong in a generally radial direction into and out of engagement with a section of said pole positioned within said inner ring, and
(5) mechanism for moving said elements generally in unison selectively toward and away from said pole section.

7. The apparatus of claim 6 which further includes
(H) control means to selectively preclude movement of said first head longitudinally of said framework toward said exit end thereof when the incising elements of said second head are engaged with said pole, and vice versa.

8. In an apparatus for deep incising poles, a incising head comprising
(A) an apertured mounting plate through which a pole to be incised is movable.
(B) spaced inner and outer supporting rings mounted on said plate generally coaxially with the longitudinal axis of said head,
(C) a series of spaced guide rods extending generally radially between said inner and outer rings,
(D) a mounting bracket supported by said guide rods for movement therealong generally in a radial direction relative to said axis,
(E) a plurality of incising elements removably engaged with each of said mounting brackets and projecting generally radially inwardly therefrom,
(F) mechanism for moving said brackets and said elements thereon generally in unison selectively toward and away from said axis,
(G) each of said incising elements engaged with each of said mounting brackets being off-set both longitudinally and peripherally relative to its adjacent incising element, and
(H) the incising elements supported on each mounting bracket being longitudinally off-set relative to corresponding elements mounted on an adjacent mounting bracket, whereby a diamond incision pattern is applied to a pole treated by said apparatus.

(References on following page)

References Cited

UNITED STATES PATENTS

| | | | |
|---|---|---|---|
| 114,446 | 5/1871 | Kenney | 83—660 |
| 1,398,320 | 11/1921 | Dunsworth | 83—192 XR |
| 1,573,143 | 2/1926 | Chickering | 144—2 |
| 1,701,324 | 2/1929 | Gram | 144—2 |
| 1,779,625 | 10/1930 | Hodgkins | 144—2 |
| 2,351,401 | 6/1944 | Charland | 144—2 |
| 2,563,758 | 8/1951 | Tinling | 144—2 |
| 3,092,158 | 6/1963 | Ellerman et al. | 144—2 |

FRANCIS S. HUSAR, Primary Examiner

U.S. Cl. X.R.

52—720; 83—193; 144—326